Nov. 3, 1936.　　　G. BROULHIET　　　2,059,434
ELASTIC SUSPENSION DEVICE FOR VEHICLES
Filed May 3, 1935
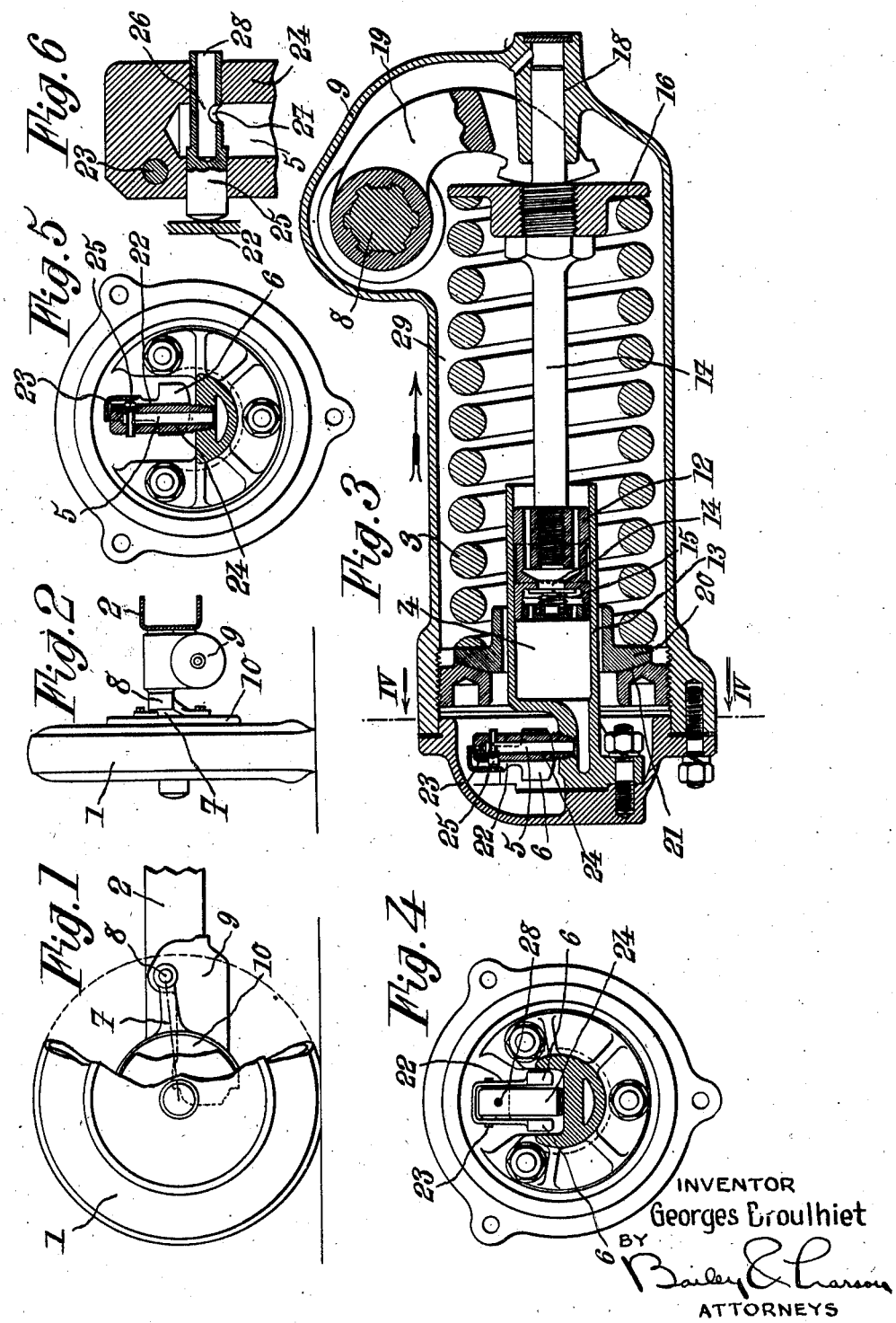
INVENTOR
Georges Broulhiet
BY
Bailey & Larson
ATTORNEYS Patented Nov. 3, 1936

2,059,434

UNITED STATES PATENT OFFICE 2,059,434

ELASTIC SUSPENSION DEVICE FOR VEHICLES

Georges Broulhiet, Paris, France

Application May 3, 1935, Serial No. 19,735
In Belgium May 3, 1934

2 Claims. (Cl. 267—11)

The present invention relates to elastic suspension devices for vehicles and it is more especially, although not exclusively concerned with suspension systems for automobile vehicles.

The object of the present invention is to provide a suspension device of this kind which is protected against the perturbing effects (variations of load) that might otherwise be exerted thereon either by the centrifugal force developed in curves or by braking.

According to the essential feature of the present invention my suspension device includes an elastic system and a hydraulic shock absorbing system provided with an orifice of flow and means for throttling said orifice operative by the displacements imparted to a movable mass by the inertia resulting from the very causes (turning or braking) that tend to produce said perturbing effects.

Other features of the present invention will result from the following detailed description of some specific embodiments thereof.

Preferred embodiments of the present invention will be hereinafter described with reference to the accompanying drawing, given merely by way of example, and in which:

Figs. 1 and 2 are a diagrammatic lateral view with some parts being cut off and an end view, respectively of a suspension device for an automobile vehicle wheel made according to a first embodiment of the present invention;

Fig. 3 is a vertical longitudinal view of this suspension device;

Fig. 4 is a sectional view on the line 4—4 of Fig. 3;

Fig. 5 is a view, similar to Fig. 4, of a suspension device made according to another embodiment of the invention;

Fig. 6 shows, on an enlarged scale, a detail of the device.

The following description relates to the case of an elastic suspension device for an automobile vehicle.

According to my invention, I interpose, between the unsuspended part of the vehicle (separate wheels 1 if said wheels are independent, as it will be hereinafter assumed, or otherwise axle) and the suspended part 2 (frame), on the one hand an elastic system 3 of any kind whatever, and, on the other hand, a hydraulic shock-absorbing device, including at least one chamber 4 the volume of which is variable in accordance with the position occupied by the unsuspended part with respect to the suspended part.

This chamber 4 is provided with an outlet conduit 5 and means for throttling said outlet conduit operative by the displacements imparted to a movable mass 6 by the inertia resulting from the causes that tend to produce the perturbing effects against which it is desired to protect the suspension.

If it is supposed, first, that it is desired to protect the suspension, at least partly, against the perturbing effects of braking, this movable mass is arranged in such manner that it can move longitudinally with respect to the vehicle.

If, on the contrary, it is desired to protect the suspension against the perturbing effects of the centrifugal force developed in curves, this movable mass is arranged in such manner that it can move transversely with respect to the vehicle.

Finally, the movable mass might be left free to move under the effect of both longitudinal and transverse inertia. Or again I might make use of two throttling devices arranged in series so as to protect the suspension, at least partly, against both the perturbing effects of braking and the perturbing effects of the centrifugal force developed in curves.

It should be noted that the perturbing effects of braking differ according to which system of suspension is employed.

First of all, whatever be this system, braking produces a force of inertia directed toward the front, acting on the center of gravity of the vehicle and which tends, when this center of gravity is located above the connections between the unsuspended parts of the vehicle and the frame, to compress the suspension springs at the front of the vehicle and to expand the suspension springs at the rear of the vehicle.

Furthermore, braking tends, in some systems of suspension, to produce an upward or a downward movement of the vehicle frame.

This is, for instance the case with suspension devices of the known type in which the wheel is carried by one of the ends of a lever 7 the other end of which is journalled, as at 8, in a casing 9 connected to the vehicle frame (this casing being for instance pivotable with respect to said frame about a vertical axis) and the brake plate (that is to say the element carrying the brake jaws) is rigid with lever 7. In systems of this kind, the braking torque is transmitted to said lever and is added, in absolute value, to the torque transmitted to said lever by the suspension spring.

Thus, according as the axis of the wheel is located ahead of, or behind, axis 8, when the vehicle is braked, the portion thereof to which frame 9 is fixed tends to move upwardly or downwardly.

It should be noted that the perturbing action of the force tending to produce this upward or downward displacement is, for each wheel, proportional to the braking on said wheel.

Therefore, if it is supposed that the braking action is evenly distributed between the wheels of the vehicle, this perturbing action is proportional to the negative acceleration of the vehicle, that is to say to the intensity of the longitudinal forces of inertia that act on the various elements of said vehicle.

The same is true of the perturbing effects due to inertia of the suspended mass and which result either from the negative acceleration of the vehicle or from centrifugal forces.

Therefore, as all the perturbing effects are proportional to the forces of inertia that act, when the vehicle is braked, or when it is running along a curve, on the various elements of said vehicle, it will suffice, in order to balance any of these disturbing effects, to provide the outlet conduit 5 above mentioned with a throttling device consisting of a valve which is acted upon by movable mass 6 and opens only when the pressure in chamber 4 is higher than the pressure necessary for balancing this disturbing action.

When it is desired to obviate the disturbing effect of braking or the disturbing action that the centrifugal force developed on a curve tends to exert on the suspension devices on the outer side of the curve along which the vehicle is running, it suffices to provide chamber 4 the volume of which decreases when the wheel moves upwardly with respect to the frame and to arrange these chambers as above explained.

But I might also, in order to obviate the disturbing action that the centrifugal force tends to exert on the suspension devices located on the inner side of the curve along which the vehicle is running, provide chambers 4 the volume of which decreases when the wheel moves downwardly with respect to the frame, said chambers being arranged in the same manner.

Besides, it will be readily understood that the hydraulic shock absorbing device proper might be devised in any suitable manner.

By way of example, I have shown, in the drawing, a shock absorbing device combined with a system of suspension of the kind above referred to and including a lever 7 journalled at 8 in casing 9.

This shock absorbing device includes a piston 12 moving in a cylinder 13 and limiting, between itself and the end of said cylinder, a chamber 4 the volume of which decreases when the wheel moves upwardly with respect to the frame.

This chamber 4 is provided with an inlet orifice 14, advantageously formed in piston 12 and cooperating with a check valve 15 which permits only the inflow of liquid into chamber 4 when the wheel moves down with respect to the frame.

This chamber 4 is further provided with an outlet orifice 5 which cooperates with the throttling device that will be hereinafter described.

The whole of this shock absorbing device may be disposed inside a spiral spring 3 bearing against a movable disc 16 fixed to a rod 17 forming the piston rod of piston 12 and the end of which opposite to said piston slides in a guide 18 carried by casing 9.

A finger 19, keyed on spindle 8, acts on rod 17, for instance through disc 16.

Finally spring 3 bears, at the end thereof opposed to the end in contact with said disc 16, against a plate 20 bearing upon a spherical surface 21 carried by casing 12.

The throttling device above referred to will now be described.

The movable mass 6 above referred to is fixed to the end of an arm 22, substantially vertical and pivoted, with respect to the casing of the device, about an axis 23.

In a first embodiment of the invention, illustrated by Figs. 3 and 4, corresponding to the throttling device acting when the vehicle is braked, this axis 23 is disposed transversely to the vehicle.

In another embodiment, illustrated by Fig. 5, corresponding to the throttling device acting when the vehicle is running along a curve, this axis 23 is disposed in the longitudinal direction of the vehicle.

Conduit 5 is disposed vertically, consisting of a tube 24 closed at its upper end and the lower end of which communicates with chamber 4.

The axis 23 above referred to is carried by the upper part of said tube 24.

This upper part of tube 24 is provided with a horizontal hole, extending for instance throughout it in a diametral direction and communicating with conduit 5. This hole consists of two portions, one of which, located on the side toward which the forces of inertia due to the disturbing effect, is of smaller cross section than the portion located on the opposite side, the difference between the sections of these portions of the hole being determined as it will be hereinafter explained.

A differential piston 25 the two portions of which are adapted to slide with a snug fit in these respective portions of the hole is mounted in said hole.

This piston 25 is provided with a conduit 26 connecting a port 27 provided in the portion of smaller cross section of the piston with an outlet orifice 28 provided at the free end of said portion.

The whole is so devised that piston 25 can move between two extreme positions: For one of these positions, conduit 5 is in communication with conduit 26 and through it with chamber 29 containing the reserve of liquid of the shock absorbing device. In the other extreme position of piston 25, this communication is cut off.

Finally, this movable mass 6 is connected with piston 25 in such manner that said piston is in the first of the two above mentioned positions when said movable mass is in the position of rest and, on the contrary, that said piston tends to be brought back into the second of these positions when the movable mass is subjected to the action of inertia. For instance, as shown by the drawing, arm 22 bears against the end of piston 25.

The passage offered to the liquid under normal conditions is so dimensioned that the operation of the shock absorbing device is the usual operation of such devices (besides, this passage may be so arranged that the braking it produces varies according to the conditions of working, for instance according to the velocity of the piston in its cylinder).

The difference between the sections of the two portions of piston 25 is so chosen that, for any value of the perturbing effect, the pressure produced in chamber 4, by this effect, balances, by acting on the surface corresponding to this difference between the sections of the two portions of the piston, the thrust transmitted to this piston by movable mass 6 (which can of course be easily calculated in every case).

This device works in the following manner:

As long as there is no cause capable of producing a perturbing effect, no acceleration acts on movable mass 6 and therefore the passage offered to the liquid for the outflow from chamber 4 remains that corresponding to a normal damping of the movements of the wheel with respect to the frame.

On the contrary, as soon as an acceleration acts on the movable mass 6 in the direction tending to push piston 25 into its housing, the outlet passage for the liquid is cut off and chamber 4 is closed.

As the liquid in said chamber is incompressible, piston 12 is prevented from moving in the direction corresponding to a decrease of the volume of said chamber, as long, at least, as the pressure exerted on the liquid present in said chamber is not higher than that necessary for pushing back piston 25 against the action of movable mass 6.

Now, as said movable mass exerts on piston 25 a thrust capable of balancing, preferably exactly, the pressure produced in chamber 4 by the perturbing effect, it is clear that the suspension proper (that is to say the elasticity of the connection between the wheel and the frame) is not in any way perturbed by the action of the movable mass.

On the contrary, the suspension keeps the whole of its sensitiveness and only the perturbing effect is eliminated.

For instance, in the case of suspensions of the special type above referred to, braking will produce no relative displacement of the frame and, whatever be the type of suspension that is employed, the vehicle will not incline laterally when running along a curve.

Of course, the movable mass, instead of being pivotally mounted, might be slidably mounted and it might, for instance, directly stop an orifice by coming into contact therewith.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. A suspension device for connecting the unsuspended part of a vehicle with the suspended part thereof, which comprises, in combination, elastic suspension means interposed between said unsuspended part and said suspended part, a hydraulic shock absorbing system interposed between said unsuspended part and said suspended part, said system including a chamber the volume of which is variable in response to relative displacements of said unsuspended and said suspended parts, a second chamber adapted to contain the reserve of liquid of the shock absorbing device, a conduit connecting said first mentioned chamber with said second chamber, a movable mass so arranged as to be displaced in response to accelerations capable of producing perturbing effects on said elastic suspension means, means for throttling said conduit responsive to the opposed actions of the liquid pressure in said conduit, on the one hand, and of said mass, on the other hand, said throttling means being so devised that the action of the liquid pressure thereon corresponding to a movement of said mass that has brought said throttling means into closed position just balances the action of said mass on said throttling means.

2. A device according to claim 1, in which said conduit is provided with a transverse hole, a differential hollow piston made of two portions of different sections movable in said hole, a port being provided in the portion of smaller cross section of the piston for connecting the inside thereof with said conduit, the difference between the cross sections of the two respective portions of said piston being such that the pressure, produced in said chamber, by any perturbing effect, balances, when said conduit has been closed by said piston, by acting on the surface of the piston corresponding to this difference of sections, the action of said movable mass on said piston.

GEORGES BROULHIET.